(12) United States Patent
Yokota et al.

(10) Patent No.: US 8,115,153 B2
(45) Date of Patent: Feb. 14, 2012

(54) SOLID STATE IMAGING DEVICE WITH MODE SELECTION, METHOD OF DRIVING SOLID STATE IMAGING DEVICE, AND IMAGE PICKUP APPARATUS

(75) Inventors: Kazuhide Yokota, Kanagawa (JP); Hisashi Kurebayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 40 days.

(21) Appl. No.: 12/484,359

(22) Filed: Jun. 15, 2009

(65) Prior Publication Data

US 2009/0242740 A1  Oct. 1, 2009

Related U.S. Application Data

(63) Continuation of application No. 11/276,171, filed on Feb. 16, 2006, now Pat. No. 7,550,704.

(30) Foreign Application Priority Data

Feb. 21, 2005  (JP) ................................. 2005-043354

(51) Int. Cl.
H01L 27/00 (2006.01)
(52) U.S. Cl. .................. 250/208.1; 348/306; 348/307; 348/308
(58) Field of Classification Search ............... 250/208.1; 348/306–308
See application file for complete search history.

(56) References Cited

U.S. PATENT DOCUMENTS

| 6,784,930 | B1 | 8/2004 | Mentzger | |
| 7,129,985 | B1* | 10/2006 | Koizumi et al. | 348/372 |
| 2001/0005227 | A1 | 6/2001 | Egawa et al. | |
| 2002/0024068 | A1* | 2/2002 | Shinohara | 257/225 |
| 2002/0054390 | A1 | 5/2002 | Koizumi et al. | |
| 2003/0206235 | A1 | 11/2003 | Suzuki | |
| 2005/0162537 | A1 | 7/2005 | Egawa et al. | |
| 2005/0167771 | A1 | 8/2005 | Koyama | |
| 2006/0012507 | A1 | 1/2006 | Nitta et al. | |
| 2006/0023096 | A1 | 2/2006 | Watanabe | |
| 2009/0225211 | A1* | 9/2009 | Oike | 348/308 |

FOREIGN PATENT DOCUMENTS

JP  2000-350101  12/2000

OTHER PUBLICATIONS

Japanese Patent Office Action corresponding to Japanese Serial No. 2005-043354 dated Mar. 16, 2010.

* cited by examiner

*Primary Examiner* — Georgia Y Epps
*Assistant Examiner* — Kevin Wyatt
(74) *Attorney, Agent, or Firm* — SNR Denton US LLP

(57) ABSTRACT

A solid-state imaging device which includes a pixel unit, a plurality of pixels in the pixel unit which are two dimensionally arranged in rows and columns and each include a photoelectric conversion element and a reset element, a driver unit which sequentially applies selective scanning to each respective row of the pixel unit, a mode switching circuit, where the mode switching circuit is configured to charge a portion of the pixels in the pixel unit and to apply an intermediate voltage to a gate of each reset element in the non-charged pixels.

4 Claims, 4 Drawing Sheets

SOLID STATE IMAGING DEVICE WITH MODE SELECTION, METHOD OF DRIVING SOLID STATE IMAGING DEVICE, AND IMAGE PICKUP APPARATUS

CROSS-REFERENCES TO RELATED APPLICATIONS

This application is a continuation of U.S. patent application Ser. No. 11/276,171, incorporated herein by reference for all purposes to the extent permitted by law. This application contains subject matter related to Japanese Patent Application JP2005-043354 filed in the Japanese Patent Office on Feb. 21, 2005, the entire contents of which are also incorporated herein by reference.

BACKGROUND OF THE INVENTION

The present invention relates to a solid state imaging device, a method of driving the solid state imaging device, and an image pickup apparatus, and, more particular to a line-sequential solid state imaging device that reads out pixel signals by a unit of row according to vertical scanning, a method of driving the solid state imaging device, and an image pickup apparatus.

The image pickup apparatus refers to a camera module including a solid state imaging device serving as an imaging device, an optical system for focusing image light of a subject on an imaging surface (a light-receiving surface) of the solid state imaging device, and a signal processor of the solid state imaging device and a camera system mounted with the camera module.

BACKGROUND OF THE ART

In a line-sequential solid state imaging device, for example, a CMOS image sensor that reads out pixel signals by a unit of row according to vertical scanning, driving for clipping out a given row range of a pixel array section and reading out only pixel signals in the row range is performed for the purpose of coping with plural angle of view formats, for the purpose of reading out pixel signals at high speed, for the purpose of correcting hand-movement blurring, and the like (see, for example, JP-2000-350101).

SUMMARY OF THE INVENTION

When the given row range (hereinafter referred to as "clipping-out row range") of the pixel array section is clipped out as described above, only respective rows in the row range have to be sequentially scanned. However, if selective scanning is not applied to rows outside the clipping-out row range at all, photocharges accumulated in photoelectric conversion elements of pixels in the rows continue to be accumulated without being reset. Finally, the photocharges overflow to adversely affect pixels around the pixels.

As measures against the problem, all that should be done is to also apply the selective scanning to rows outside the clipping-out row range, transfer the charges from the photoelectric conversion elements to a floating diffusion section, and reset the charges transferred to the floating diffusion section.

However, when the selective scanning is applied to the rows outside the clipping-out row range after selectively scanning only the respective rows in the clipping-out row range, a frame rate is not increased. When it is attempted to apply the selective scanning to the rows outside the clipping-out row range in parallel to the selective scanning for the respective rows in the clipping-out row range, it is necessary to provide a vertical selector for performing selective scanning for the rows outside the clipping-out row range in addition to a vertical selector for performing usual selective scanning. Alternatively, it is necessary to adopt a complicated circuit configuration in order to cause the vertical selector for performing usual selective scanning to perform complicated selective scanning.

While the pixel signals of the respective rows in the clipping-out row range are readout, scanning for an electronic shutter operation is applied to the rows outside the clipping-out row range or the scanning is not applied to the rows. Thus, it is apprehended that irregularity due to the electronic shutter operation, that is, a level difference caused in contrast or brightness, a so-called shutter level difference appears in a video that is based on the pixels signals in the clipping-out row range.

The invention has been devised in view of the problems. It is desirable to provide a solid state imaging device that is capable of preventing photocharges from being accumulated in photoelectric conversion elements in rows outside a clipping-out row range even if selective scanning is not applied to the rows outside the clipping-out row range, a method of driving the solid state imaging device, and an image pickup apparatus.

According to an embodiment of the invention, there is provided a solid state imaging device that has a pixel array section in which pixels including photoelectric conversion elements are two-dimensionally arranged. The solid state imaging device includes a unit that discharges, when a mode for reading out only pixel signals of respective rows in a given row range in the pixel array section is set, charges generated in the photoelectric conversion elements in the respective pixels of rows outside the row range to a pixel power supply.

In the solid state imaging device described above, when a mode for selectively scanning only rows in a given clipping-out row range in the pixel array section and clipping and reading out pixel signals in the clipping-out row range is set, for the rows outside the given clipping-out row range, charges generated in the photoelectric conversion elements are discharged to the pixel power supply. Consequently, it is possible to prevent charges from continuing to be accumulated in the photoelectric conversion elements even if selective scanning is not applied to the rows outside the clipping-out row range.

DETAILED DESCRIPTION OF THE PRESENTLY PREFERRED EMBODIMENTS

Embodiments of the invention will be hereinafter explained in detail with reference to the accompanying drawings.

Figure 1:
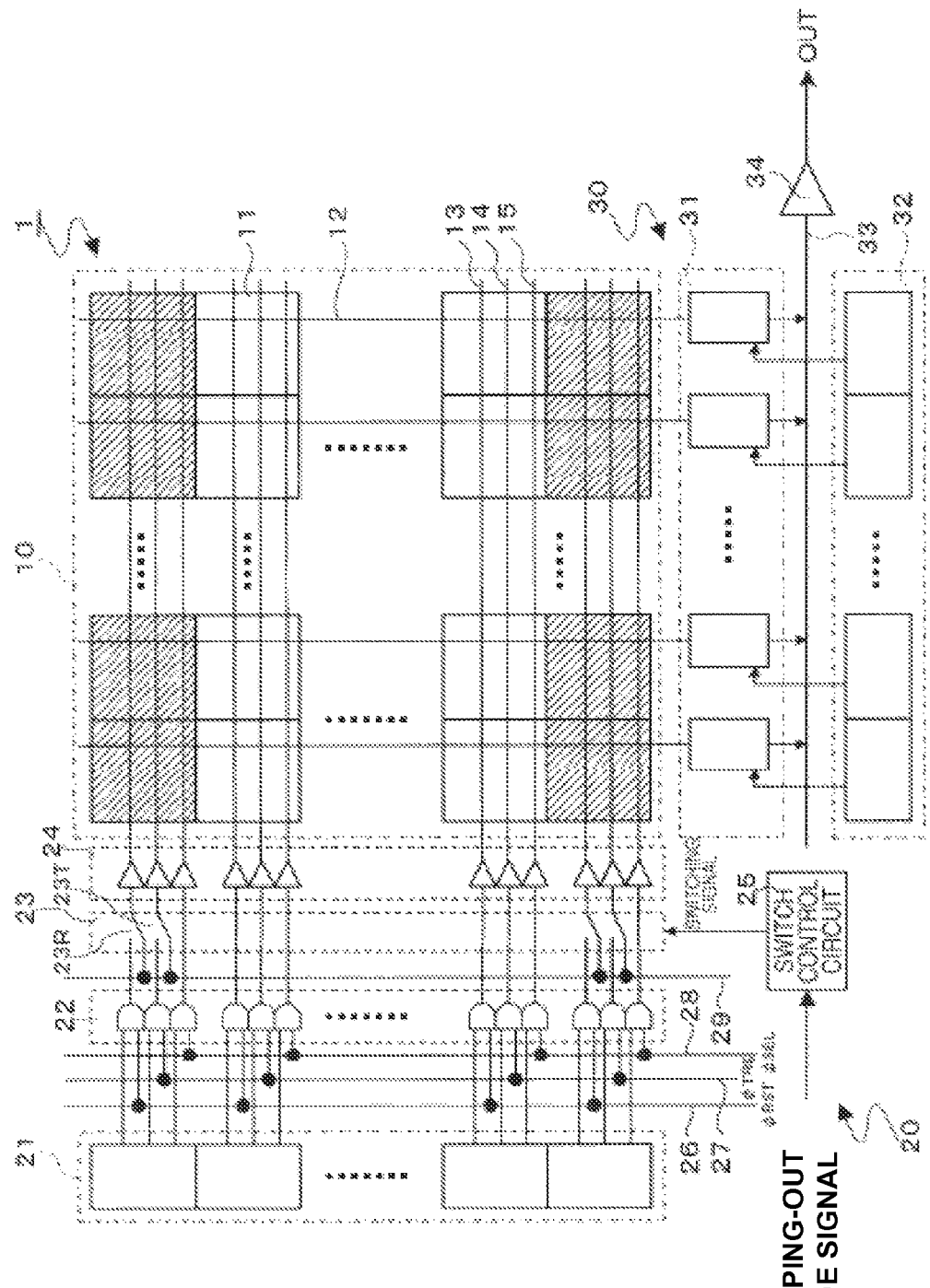
FIG. 1 is a block diagram showing an example of a constitution of a CMOS image sensor according to an embodiment of the invention.

FIG. 1 is a block diagram showing an example of a constitution of a solid state imaging device, for example, a CMOS image sensor according to an embodiment of the invention. As shown in FIG. 1, a CMOS image sensor 1 according to this embodiment includes a pixel array section 10, a vertical driver 20, and a horizontal driver 30.

In the pixel array section 10, unit pixels (hereinafter simply referred to as "pixels" in some cases) 11 including photoelectric conversion elements are two-dimensionally arranged. A vertical signal line 12 is wired for each pixel column of the pixel arrangement and driving lines such as a reset line 13, a charge transfer line 14, and a selection line 15 are wired for each pixel row.

Figure 2:
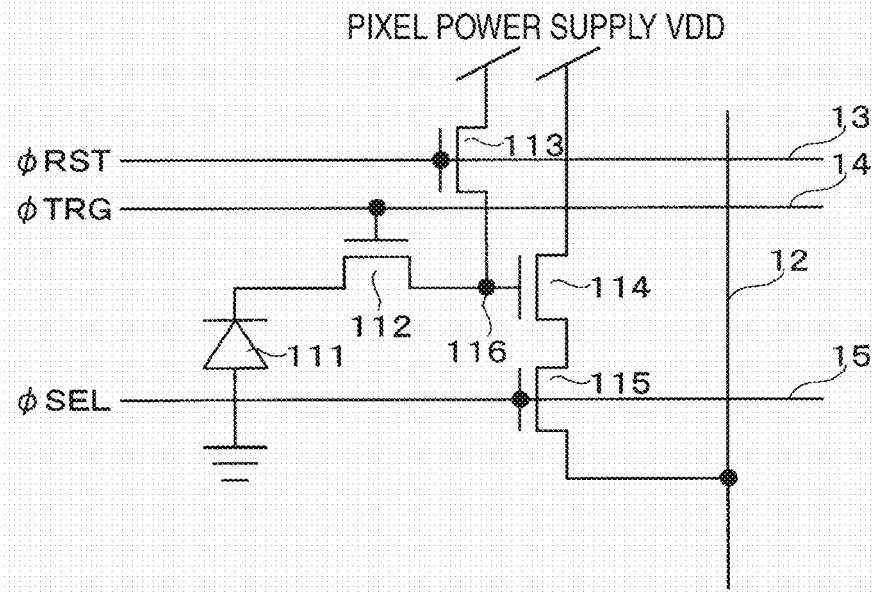
FIG. 2 is a circuit diagram showing a circuit configuration of a unit pixel of a four-transistor constitution.

FIG. 2 is a circuit diagram showing an example of a circuit configuration of the unit pixel 11. In the figure, sections equivalent to those in FIG. 1 are denoted by the identical reference numerals.

As shown in FIG. 2, the unit pixel 11 in this example of the circuit is a pixel circuit including, for example, four transistors, namely, a charge transfer transistor 112, a reset transistor 113, an amplification transistor 114, and a selection transistor 115 in addition to the photoelectric conversion element, for example, a photodiode 111. In this embodiment, for example, N-channel MOS transistors are used as the transistors 112 to 115.

The transfer transistor 112 is connected between a cathode of the photodiode 111 and a floating diffusion (FD) section 116. The transfer transistor 112 is turned on when a charge transfer pulse φTRG is given to a gate of the transfer transistor 112 via the charge transfer line 14. The transfer transistor 112 transfers photocharges (electrons) photoelectrically converted by the photodiode 111 to the FD section 116.

A drain and a source of the reset transistor 113 are connected to a pixel power supply VDD and the FD section 116, respectively. The reset transistor 113 is turned on when a reset pulse φRST is given to a gate of the reset transistor 113 via the reset line 13. The reset transistor 113 resets a potential at the FD section 116 prior to transfer of signal charges from the photodiode 111 to the FD section 116.

A gate and a drain of the amplification transistor 114 are connected to the FD section 116 and the pixel power supply VDD, respectively. The amplification transistor 114 outputs the potential at the FD section 116, which has been reset by the reset transistor 113, as a reset level and outputs the potential at the FD section 116, to which signal charges have been transferred by the transfer transistor 112, as a signal level.

A drain and a source of the selection transistor 115 are connected to, for example, a source of the amplification transistor 114 and the vertical signal line 12, respectively. The selection transistor 115 is turned on when a selection pulse φSEL is given to a gate of the selection transistor 115 via the selection line 15. The selection transistor 115 brings the unit pixel 11 into a selected state and relays a signal outputted from the amplification transistor 114 to the vertical signal line 12.

It is also possible to connect the selection transistor 115 between the pixel power supply VDD and the drain of the amplification transistor 114.

Referring back to FIG. 1, the vertical driver 20 includes a vertical selector 21, an AND circuit 22, a mode switching circuit 23, a buffer circuit 24, and a switch control circuit 25. The reset pulse φRST, the charge transfer pulse φTRG, and the selection pulse φSEL are supplied to the vertical driver 20 from a not-shown timing generator through the reset pulse line 26, the charge transfer pulse line 27, and the selection pulse line 28.

The vertical selector 21 includes a shift register or a decoder. The vertical selector 21 sequentially outputs vertical scanning pulses for selectively driving the respective pixels 11 of the pixel array section 10 in order by a unit of row. Usually, a shutter selector for performing an electronic shutter operation is arranged in parallel to the vertical selector 21. For simplification of illustration, the shutter selector is not shown in the figure.

In the AND circuit 22, three AND circuits corresponding to the reset transistor 113, the charge transfer transistor 112, and the selection transistor 115 of the pixel 11, respectively, are arranged in association with the respective pixel rows of the pixel array section 10. The AND circuit 22 captures the reset pulse φRST, the charge transfer pulse φTRG, and the selection pulse φSEL in the rows where the vertical scanning pulses sequentially outputted from the vertical selector 21 are active.

The mode switching circuit 23 is provided in order to realize a clipping-out mode for selectively scanning only rows in a given clipping-out row range among the respective rows of the pixel array section 10 and clipped and reading out pixels signals in the clipping-out row range. A specific constitution of the mode switching circuit 23 is as described below.

In the mode switching circuit 23, two switching elements 23R and 23T corresponding to the reset pulse φRST and the charge transfer pulse φTRG, respectively, are arranged in association with rows outside the clipping-out row range (shaded pixel rows in FIG. 1; for simplification of illustration, one row in an upper part and one row in a lower part are shown, respectively). Both the switching elements 23R and 23T have a switch constitution with two inputs and one output.

The switching element 23R uses the reset pulse φRST outputted from the AND circuit 22 as one input and uses a power supply voltage supplied from a power supply line 29 as the other input. The switching element 23R selects the reset pulse φRST in a usual all-pixel readout mode for selectively scanning all the rows of the pixel array section 10 in order. The switching element 23R selects the power supply voltage in response to a switching signal give from the switch control circuit 25 in a clipping-out mode for selectively scanning only the rows in the given clipping-out row range.

The switching element 23T uses the charge transfer pulse φTRG outputted from the AND circuit 22 as one input and uses the power supply voltage supplied from the power supply line 29 as the other input. The switching element 23T selects the charge transfer pulse φTRG in the all-pixel readout mode and selects the power supply voltage in the clipping-out mode in response to the switching signal given from the switch control circuit 25.

In the buffer circuit 24, three buffers corresponding to the reset pulse φRST, the charge transfer pulse φTRG, and the selection pulse φSEL, respectively are arranged in association with the respective pixel rows of the pixel array section 10.

Among the three buffers, the buffer corresponding to the reset pulse φRST drives the reset line 13 of the pixel array section 10 on the basis of the reset pulse φRST or the power supply voltage outputted from the switching element 23R. The buffer corresponding to the charge transfer pulse φTRG drives the charge transfer line 14 of the pixel array section 10 on the basis of the charge transfer pulse φTRG or the power supply voltage outputted from the switching element 23T. The buffer corresponding to the selection pulse φSEL drives the selection line 15 of the pixel array section 10 on the basis of the selection pulse φSEL directly supplied from the AND circuit 22.

The switch control circuit 25 gives the mode switching circuit 23 a switching signal for switching the respective switching elements 23R and 23T of the mode switching circuit 23, which are in the state in which the reset pulse φRST and the charge transfer pulse φTRG at the time of the all-pixel readout mode are selected to the power supply voltage side in response to a clipping-out mode signal given from the outside at the time when the clipping-out mode is set.

The horizontal driver 30 includes a column signal processor 31, a horizontal selector 32, a horizontal signal line 33, and an output circuit 34.

The column signal processor 31 is arranged for, for example, each pixel column of the pixel array section 10. The column signal processor 31 applies, for each pixel column, signal processing such as Correlated Double Sampling (CDS) processing for removing fixed pattern noise of the pixel 11 to a pixel signal outputted through the vertical signal line 12. Horizontal selection switches are provided for the respective pixel columns at an output stage of the column signal processor 31. It is also possible to provide an A/D conversion function in the column signal processor 31.

The horizontal selector 32 includes a shift register or a decoder. The horizontal selector 32 sequentially outputs horizontal scanning pulses for selectively scanning the horizontal selection switches, which are provided for the respective pixel columns at the output stage of the column signal processor 31, in order. When the horizontal selection switches are turned on in order in response to the horizontal scanning pulses, the pixel signals after being subjected to the signal processing in the column signal processor 31 are outputted to the horizontal signal line 33 in order and outputted to the outside through the output circuit 34.

A circuit operation of the CMOS image sensor 1 according to this embodiment having the constitution described above will be explained for each operation mode.

First, when the usual all-pixel readout mode is set, a clipping-out mode signal is inactivated (in an inactive state), the switch control circuit 25 brings a switching signal given to the mode switching circuit 23 into an inactive state. Consequently, in the mode switching circuit 23, the switching element 23R and the switching element 23T are in the state for selecting the reset pulse φRST and the charge transfer pulse φTRG, respectively.

In this state, when vertical scanning pulses are sequentially outputted from the vertical selector 21 according to selective scanning by the vertical selector 21, in response to this, switching elements provided in threes of the AND circuit 22 are turned on in order and capture the reset pulse φRST, the charge transfer pulse φTRG, and the selection pulse φSEL.

Specifically, in the AND circuit 22, first, the selection pulse φSEL is captured and supplied to the respective pixel rows of the pixel array section 10 in order via the buffer circuit 24. Consequently, the selection transistors 115 of the pixels 11 are turned on in order by a unit of row and the respective pixels 11 are selected by a unit of row.

In a state in which a certain pixel row is selected, the reset pulse φRST is captured and supplied to the respective pixels 11 of the selected row via the switching element 23R of the mode switching circuit 23 and the buffer circuit 24. As a result, in each of the pixels 11 of the selected row, the reset transistor 113 is turned on. Consequently, an operation for resetting a potential at the FD section 116 to a potential at the pixel power supply VDD is performed. The potential at the FD section 116 at this point is outputted to the vertical signal line 121 as a reset level via the amplification transistor 114 and the selection transistor 115.

Subsequently, the charge transfer pulse φTRG is captured and supplied to the respective pixels 11 of the selected row via the switching element 23T of the mode switching circuit 23 and the buffer circuit 24. As a result, in each of the pixels 11 of the selected row, the charge transfer transistor 112 is turned on. Consequently, photocharges photoelectrically converted by the photodiode 111 are transferred to the FD section 16. A potential at the FD section 116 is outputted to the vertical signal line 121 as a signal level via the amplification transistor 114 and the selection transistor 115.

The reset level and the signal level outputted from the pixel 11 to the vertical signal line 12 in order are supplied to the column signal processor 31 by a unit of row. In the column signal processor 31, for example, a difference between the reset level and the signal level is calculated to apply, for example, processing for removing a fixed pattern noise of the pixel 11 to the pixel 11. Pixel signals for one row after the signal processing in the column signal processor 31 are selected in order according to selective scanning by the horizontal selector 32 and outputted to the outside of the chip through the horizontal signal line 33 and the output circuit 34.

Subsequently, only rows in a given clipping-out row range are subjected to selective scanning. When a clipping-out mode for clipping and reading out pixel signals in the clipping-out row range is set, a clipping-out mode signal is activated (comes into an active state). Thus, the switch control circuit 25 brings a switching signal given to the mode switching circuit 23 into an active state. Consequently, in the mode switching circuit 23, both the switching elements 23R and 23T come into a state for selecting the power supply voltage.

In this state, when vertical scanning pulses are sequentially outputted from the vertical selector 21 according to selective scanning by the vertical selector 21, the mode switching circuit 23 captures the reset pulse φRST, the charge transfer pulse φTRG, and the selection pulse φSEL via the AND circuit 22.

However, in the mode switching circuit 23, both the switching elements 23R and 23T corresponding to the rows outside the clipping-out row range are in the state for selecting the power supply voltage. Thus, the reset pulse φRST and the charge transfer pulse φTRG are not supplied to the rows outside the clipping-out row range. Only the selection pulse φSEL is supplied to the rows outside the clipping-out row range.

In the respective pixels 11 of the selected row outside the clipping-out row range, the power supply voltage is supplied instead of the reset pulse φRST and the charge transfer pulse φTRG. A level of the power supply voltage is set to a level that makes it possible to keep the charge transfer transistor 112 and the reset transistor 113 on (in a conduction state).

Consequently, since the charge transfer transistor 112 is kept on, the charge transfer transistor 112 continues to transfer photocharges generated in the photodiode 111 to the FD section 116. At the same time, since the reset transistor 113 is kept on, the photocharges transferred from the photodiode 111 to the FD section 116 are discharged to the pixel power supply VDD. Consequently, the photocharges do not overflow from the photodiode 111 even if a pixel signal readout operation is not applied to the pixels 11 outside the clipping-out row range.

On the other hand, concerning the respective rows in the clipping-out row range, the switching elements 23R and 23T are not provided in the mode switching circuit 23. Thus, as at the time of the usual all-pixel readout mode, signals of the respective pixels 11 are supplied through the column signal processor 31 and, then, outputted to the outside of the chip via the horizontal signal line 33 and the output circuit 34 according to selective scanning by the vertical selector 21. As a result, pixel signals in the given clipping-out row range are clipped out.

Clipping out of the pixel signals in the given clipping-out row range is described above. Clipping out of pixel signals in a given clipping-out column range is performed using a well-known method in a signal processing system provided outside the chip.

As described above, in the CMOS image sensor 1 that can selectively adopt the usual all-pixel readout mode and the clipping-out mode, when the clipping-out mode for reading out only pixel signals of respective rows in a given row range is set, photocharges generated in the photodiode 111 in each of the pixels 11 of rows outside the clipping-out row range are discharged to the pixel power supply VDD. Thus, the photocharges do not overflow from the photodiode 111 even if a pixel signal readout operation is not applied to the pixels 11 outside the clipping-out row range.

When the clipping-out mode is set, the charge transfer transistor 112 and the reset transistor 113 are turned on, photocharges generated in the photodiode 111 in each of the pixels 11 of the rows outside the clipping-out row range are transferred to the FD section 116, and the photocharges in the FD section 116 are discharged to the pixel power supply VDD. Consequently, it is possible to realize the solid state imaging device according to the embodiment by simply adding the mode switching circuit 23 without changing the circuit configuration of the pixels 11 and without complicating the constitution of the vertical selector 21 or providing plural vertical selectors.

Moreover, while pixel signals of the respective rows in the clipping-out row range are read out, it is possible to prevent overflow of photocharges in the photodiode 111 in each of the pixels of the rows outside the clipping-out row range even if scanning for an electronic shutter operation is applied or not applied to the rows outside the clipping-out row range. This makes it possible to prevent image quality failure due to a shutter level difference.

In this embodiment, photocharges generated in the photodiode 111 are transferred to the FD section 116 by turning on the charge transfer transistor 112. The photocharges in the FD section 116 are discharged to the pixel power supply VDD by turning on the reset transistor 113. However, this is only an example and the invention is not limited to this.

For example, a charge discharging section for discharging charges to the pixel power supply VDD is provided adjacent to the photodiode 111 for each of the pixels 11 and a gate section is provided between the charge discharging section and the photodiode 111. When the clipping-out mode is set, photocharges generated in the photodiode 111 in each of the pixels 11 in the rows outside the clipping-out row range is discharged to the pixel power supply VDD via the charge discharging section by turning on the gate section. Any constitution may be adopted as long as it is possible to discharge photocharges generated in the photodiode 111 to the pixel power supply VDD.

In the embodiment described above, as an example, the invention is applied to the CMOS image sensor 1 in which the unit pixel 11 includes the four transistors, namely, the charge transfer transistor 112, the reset transistor 113, the amplification transistor 114, and the selection transistor 115. However, the pixel 11 is not limited to the constitution in which the four transistors are provided. It is possible to obtain the same operational effects as the embodiment even in pixels of other formats if driving for continuing an operation for discharging photocharges generated in the photodiode 111 to the pixel power supply VDD is performed for respective pixels in rows outside the clipping-out row range. For example, a pixel constitution with three transistors in which one transistor is used as both the amplification transistor 114 and the selection transistor 115 may be adopted.

Figure 3:
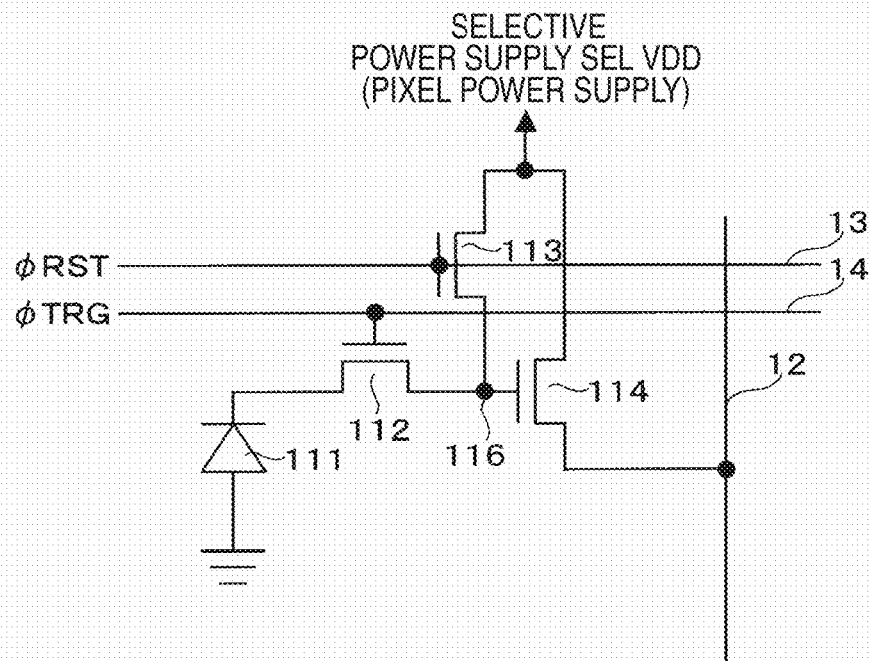
FIG. 3 is a circuit diagram showing a circuit configuration of a unit pixel of a three-transistor constitution.

FIG. 3 is a circuit diagram showing a circuit configuration of the unit pixel 11 of a three-transistor constitution. In the figure, sections equivalent to those in FIG. 2 are denoted by the identical reference numerals.

In FIG. 3, respective drains of the reset transistor 113 and the amplification transistor 114 are connected to a selective power supply (a pixel power supply) SELVDD. A source follower of the amplification transistor 114 is directly connected to the vertical signal line 12. The other parts of the circuit configuration are basically the same as those in FIG. 2. In the unit pixel 11 of the three-transistor constitution, when the selective power supply SELVDD changes to a Hi level, the amplification transistor 114 comes into an operation state to select the unit pixel 11.

Figure 4:
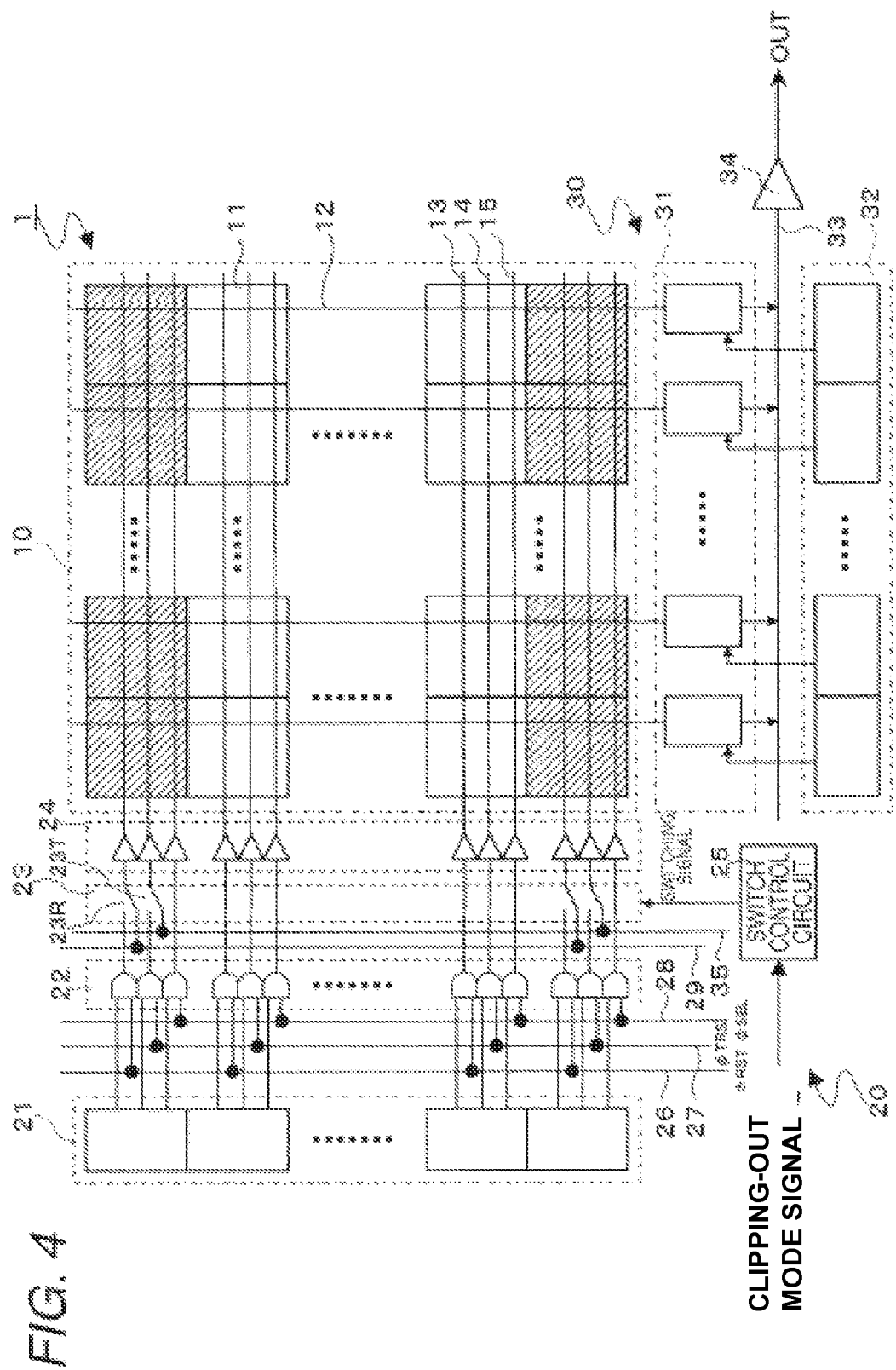
FIG. 4 is a block diagram showing an example of a constitution of a CMOS image sensor in which a unit pixel has the three-transistor constitution.

FIG. 4 is a block diagram showing an example of a constitution of a CMOS image sensor in which the unit pixel 11 has the three-transistor constitution. In the figure, sections equivalent to those in FIG. 1 are denoted by the identical reference numerals. The CMOS image sensor is different from that shown in FIG. 1 in that the pixel power supply (the selective power supply SELVDD) supplied to the pixel 11 through the power supply line 29 is variable and that an intermediate voltage line 35 that supplies an intermediate voltage (a voltage in the middle of a Hi level and a Lo level of the selective power supply SELVDD) to the reset line 13 of the pixel 11 is added.

Figure 5:
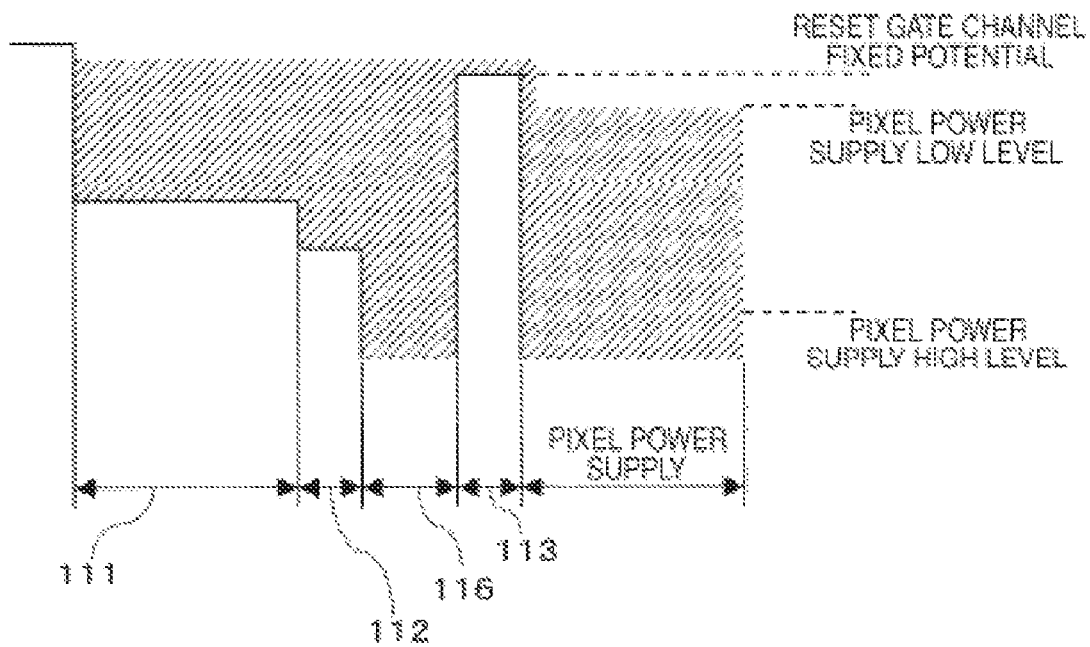
FIG. 5 is a potential chart for explaining operations in the case of the three-transistor constitution.

An operation at the time when the unit pixel 11 has the three-transistor constitution will be explained using a potential chart in FIG. 5.

In the case of the three-transistor constitution, for the respective pixels of the rows outside the clipping-out row arrange, the charge transfer transistor 112 is turned on to apply the intermediate potential to the gate of the reset transistor 113 or control an impurity injection amount for threshold control of the reset transistor 113. In this way, a channel potential is controlled to be lower than the Lo level of the selective power supply SELVDD and higher than, for example, a P well potential around the photodiode 111.

Since the channel potential of the reset transistor 113 is controlled to be lower than the Lo level of the selective power supply SELVDD, it is possible to bring the pixels outside the clipping-out row range to an unselected state without being affected by an operation for transitioning the Hi level and the Lo level of the selective power supply SELVDD to select a pixel to be read out and make a read-out pixel unselected.

The channel potential of the reset transistor 113 is controlled to be higher than the P well potential around the photodiode 111. The charge transfer transistor 112 is controlled to be turned on. Thus, charges generated in pixels do not overflow to pixels around the pixels getting over a P well section around the photodiode 111. The charges are discharged to the selective power supply (the pixel power supply) SELVDD through a channel of the reset transistor 113.

In the pixel circuit in FIG. 3, in order to select a readout row pixel, the reset transistor 113 of the readout row pixel is turned on through the reset line 13 of a readout row and, then, the selective power supply SELVDD is set to the Hi level. Consequently, a voltage at the FD section 116 of the readout row pixel changes to the Hi level. As a result, the amplification transistor 114 comes into the operation state. Then, the selective power supply SELVDD is returned to the Lo level.

In this case, in a pixel outside a clipping-out range, a channel potential of the reset transistor 113 is set lower than the Lo level of the selective power supply SELVDD by, for example, applying the intermediate voltage to the gate of the reset transistor 113. Thus, even if the selective power supply SELVDD transitions from the Lo level to the Hi level and the Hi level to the Lo level, the potential at the FD section 116 of the pixel outside the clipping-out range is kept fixed to the Lo level at which the amplification transistor 114 is in a non-operation state.

Subsequently, in order to perform readout in the readout row pixel, the charge transfer transistor 112 is turned on and, then, turned off through a charge transfer pulse line of the readout row. When the readout in the readout row pixel ends, in order to make the readout row pixel unselected, the reset transistor 113 of the readout row pixel is turned on through the reset line 13 of the readout row and, then, the selective power supply SELVDD is set to the Lo level. Consequently, the voltage at the FD section 116 of the readout row pixel changes to the Lo level. As a result, the amplification transistor 114 comes into the non-operation state. Then, the selective power supply SELVDD is returned to the Lo level.

In this case, in the pixel outside the clipping-out range, a channel potential of the reset transistor 113 is set lower than the Lo level of the selective power supply SELVDD by, for example, applying the intermediate voltage to the gate of the reset transistor 113. Thus, even if the selective power supply SELVDD transitions from the Lo level to the Hi level and the Hi level to the Lo level, the potential at the FD section 116 of the pixel outside the clipping-out range is kept fixed to the Lo level at which the amplification transistor 114 is in a non-operation state.

During the series of operations, the channel potential of the reset transistor 113 of the pixel outside the clipping-out range is controlled to be higher than the P well potential around the photodiode 111. Charges accumulated in the photodiode 111 and the FD section 116 are discharged to the selective power supply SELVDD through the channel of the reset transistor 113 without overflowing to pixels around the pixel getting over the P well section around the photodiode 111. As a result, it is possible to perform driving that can control overflow for pixels outside the clipping-out range while performing an operation for reading out pixels in the clipping-out range.

In this case, the invention is applied to the CMOS image sensor as an example. However, the invention is not limited to the application to the CMOS image sensor. It is possible to apply the invention to line-sequential solid state imaging devices in general that read out pixel signals by a unit of row according to vertical selection scanning.

The CMOS image sensor 1 according to this embodiment explained above is suitably used as an imaging device for an image pickup apparatus (a camera module) such as a digital still camera or a video camera that is capable of setting a clipping-out mode for clipping out a given row range of a pixel array section and reading out only pixel signals in the row range for the purpose of coping with plural angle of view formats, for the purpose of reading out pixel signals at high speed, for the purpose of correcting hand-movement blurring, and the like.

Figure 6:
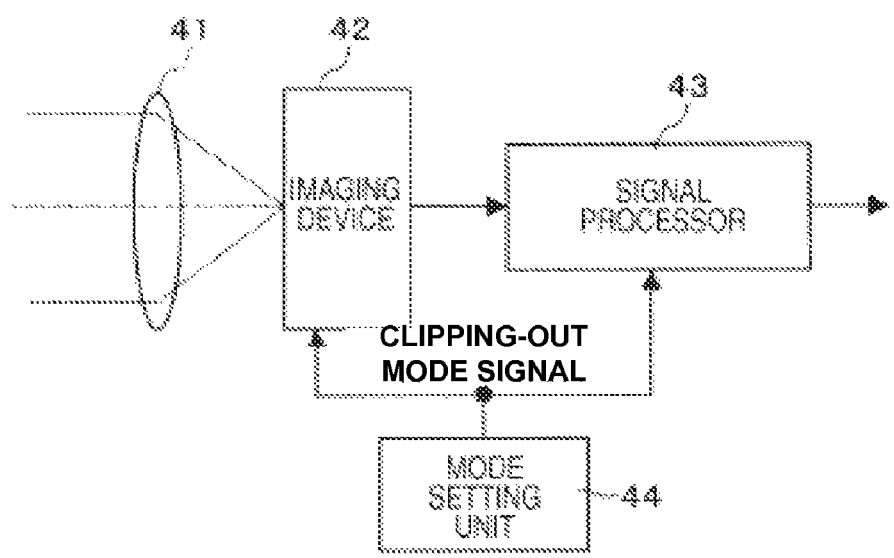
FIG. 6 is a block diagram showing an example of a constitution of an image pickup apparatus according to an embodiment of the invention.

FIG. 6 is a block diagram showing an example of a constitution of an image pickup apparatus according to an embodiment of the invention. As shown in FIG. 6, the image pickup apparatus according to this embodiment includes a lens 41 forming a part of an optical system, an imaging device 42, a signal processor 43, and a mode setting unit 44.

The lens 41 focuses image light from a subject on an imaging surface of the imaging device 42. The imaging device 42 converts the image light focused on the imaging surface by the lens 41 into an electric signal by a unit of pixel and outputs the image signal obtained. The CMOS image sensor 1 according to the embodiment described above is used as the imaging device 42.

The signal processor 43 applies various kinds of signal processing to the signal outputted from the imaging device 42. The mode setting unit 44 alternatively sets operation modes, specifically, a usual all-pixel readout mode for selectively scanning all rows of a pixel array section in order and a clipping-out mode for selectively scanning only rows in a given clipping-out row range, according to a designation input by a user.

When the all-pixel readout mode is set by the mode setting unit 44, the imaging device 42 reads out signals of all pixels according to the operation of the all-pixel readout mode. When the clipping-out mode is set, the imaging device 42 reads out only signals of pixels of the respective rows in the given clipping-out row range according to the operation of the clipping-out mode. For pixels of rows outside the clipping-out row range, the imaging device 42 discharges photocharges generated in photoelectrical conversion elements to a pixel power supply.

On the other hand, when the clipping-out mode is set by the mode setting unit 44, the signal processor 43 applies signal processing for electrically performing clipping out in a given clipping-out column range to a signal subjected to clipping-out processing in the given clipping-out row range and outputted by the imaging device 42 (however, this processing is performed only when the given clipping-out column range is set).

As described above, in the image pickup apparatus such as a digital still camera or a video camera, since the CMOS image sensor 1 according to the embodiment described above is mounted as the imaging device 42 for the image pickup apparatus, the CMOS image sensor 1 can clip and read out only pixel signals in the given clipping-out row range according to setting of the clipping-out mode. Thus, it is possible to increase a frame rate by the number of rows to be clipped out with respect to the number of all pixels of the pixel array section. Moreover, photocharges generated in the photoelectric conversion elements in pixels of rows outside the clipping-out row range do not overflow to pixels around the pixels. Thus, it is possible to improve an image quality at the time when the clipping-out mode is set.

According to an embodiment of the invention, it is possible to prevent photocharges from being accumulated in the photoelectric conversion elements of the rows outside the clipping-out row range even if selective scanning is not applied to the rows outside the clipping-out row range. This makes it possible to realize the clipping-out mode for clipping out the given clipping-out row range even if plural vertical selectors are not provided or a complicated circuit configuration is not adopted.

It should be understood by those skilled in the art that various modifications, combinations, sub-combinations, and alterations may occur depending on design requirements and other factors insofar as they are within the scope of the appended claims or the equivalents thereof.

What is claimed is:
1. A solid-state imaging device comprising:
a pixel unit;
a plurality of pixels in the pixel unit which are two dimensionally arranged in rows and columns, each pixel including a photoelectric conversion element and a reset element;
a driver unit which sequentially applies selective scanning to each respective row of the pixel unit; and a mode switching circuit between the driver unit and the plurality of pixels that selects a readout mode from at least two readout modes, wherein, the mode switching circuit supplies a selection signal only to the unscanned pixels and supplies a reset signal, a transfer signal and a selection signal to each of the selected pixels.

2. The solid state imaging device of claim 1, wherein the readout mode selected by the mode switching circuit is a clipping-out mode, which only selects a portion of the plurality of pixels to scan.

3. The solid state imaging device of claim 1, wherein each pixel includes a transfer unit to output a signal from the photoelectric conversion element.

4. The solid state imaging device of claim 3, wherein each pixel includes a floating diffusion layer between the photoelectric conversion element and the transfer unit.

* * * * *